No. 777,011. PATENTED DEC. 6, 1904.
R. N. FAIRBANKS.
RELIEVING GEAR FOR TRACK SCALES.
APPLICATION FILED DEC. 18, 1902. RENEWED SEPT. 28, 1904.
NO MODEL. 2 SHEETS—SHEET 2.
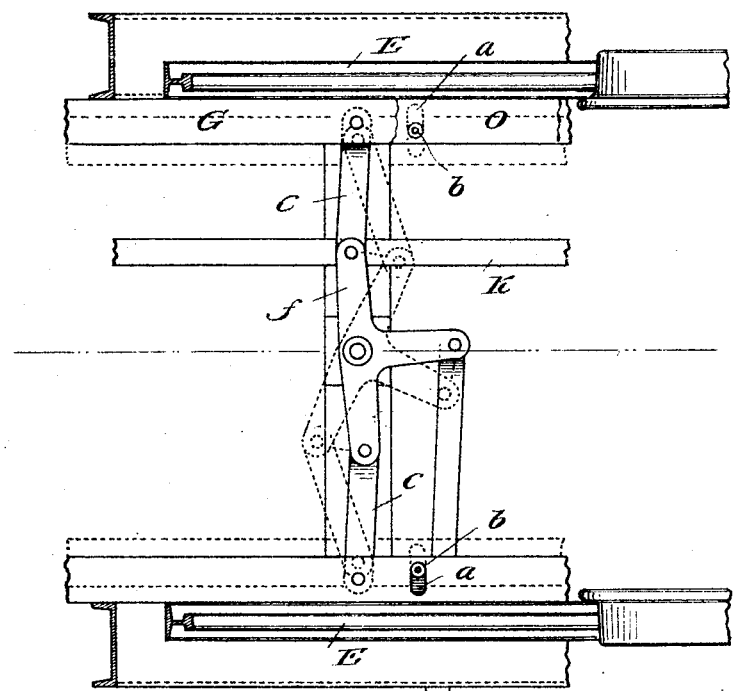
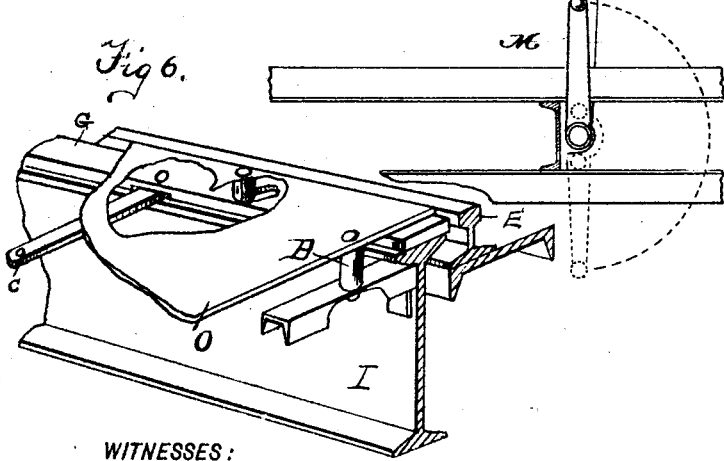
WITNESSES:
INVENTOR
R. N. Fairbanks
BY
Sturtevant & Truly
ATTORNEYS No. 777,011.                                                        Patented December 6, 1904.

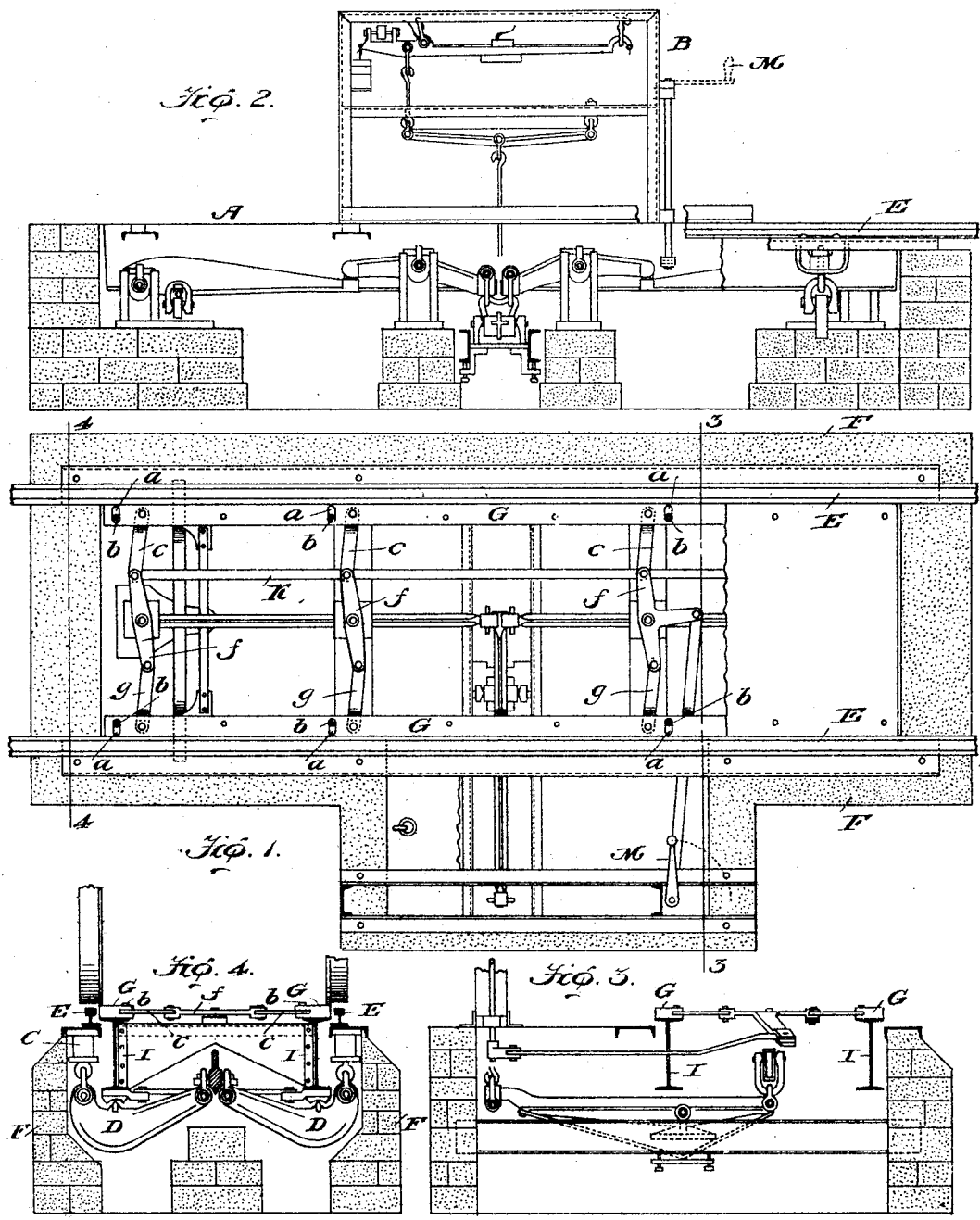

UNITED STATES PATENT OFFICE.

ROBERT NOYES FAIRBANKS, OF LONDON, ENGLAND, ASSIGNOR TO THE E. & T. FAIRBANKS & COMPANY, OF ST. JOHNSBURY, VERMONT, A CORPORATION OF VERMONT.

RELIEVING-GEAR FOR TRACK-SCALES.

SPECIFICATION forming part of Letters Patent No. 777,011, dated December 6, 1904.

Application filed December 18, 1902. Renewed September 28, 1904. Serial No. 226,284. (No model.)

*To all whom it may concern:*

Be it known that I, ROBERT NOYES FAIRBANKS, a citizen of the United States, residing at London, England, have invented certain new and useful Improvements in Relieving-Gear for Track-Scales, of which the following is a description, reference being had to the accompanying drawings and to the letters of reference marked thereon.

My invention relates to improvements in railroad track-scales, and especially to what are known in the trade as "relieving-gear devices."

The general type of scale to which the invention is herein shown as applied is the well-known Fairbanks type, the only important change being that the main levers instead of being suspended from stands on the bench-walls are suspended from yokes bolted or riveted to the channel-coping.

In some relieving-gear devices arrangements are provided so that when it is desired to weigh a wagon or other vehicle passing over the scale the platform is arranged to be lifted off its pivots, so as to avoid jar to such pivots.

Ordinarily in the use of track-scales with relieving attachments two sets of rails are provided, one set resting upon the scale-platform, while of the other set one rests upon the coping outside the scale-platform and the other is supported by stands or framework coming up through the platform, and by means of switches at each end of the scales the cars can be transferred over the live rails on the scale-platform or over the dead rails, as is desired.

The object of the present invention is to provide a construction in which the platform may be narrowed somewhat and the scale provided with only one set of rails, these rails resting upon the outer walls of the foundation, there being no rails whatever upon the scale-platform, there being, however, provided upon the scale-platform a horizontally-shiftable framework or support which when it is desired to use the platform for purposes of weighing can be brought into position so that the flanges of the car-wheels will ride upon and be supported by this framework; thus bringing the strain upon the platform to allow the weighing to be accomplished, but taking the weight off the tracks.

The invention therefore consists of a railroad track or other platform scale having movable ways adapted to be brought into position to support the vehicle to be weighed and take the weight thereof off the ordinary support therefor.

The invention also consists in the matters hereinafter described, and referred to in the appended claims.

My invention is illustrated in the accompanying drawings, in which—

Figure 1 is a top plan view of a railroad track-scale, illustrating my invention. Fig. 2 is a sectional side elevation. Fig. 3 is a sectional view on the line 3 3 of Fig. 1. Fig. 4 is a sectional view on the line 4 4 of Fig. 1. Fig. 5 is a detail view of the shifting mechanism. Fig. 6 is a detail view illustrating the covering-plate.

In the drawings it will not be necessary to refer to the usual parts of the scale, except to state that A represents the platform; B, the beam-box; C, the main levers; D, the multiplying-levers, and E the set of rails resting upon the outer walls F of the foundation, there being no rails upon the scale-platform whatever.

On top of the platform along both sides adjacent to the side walls of the foundation are flat bars of iron G, having transverse elongated slots $a$, through which pass studs $b$, secured to the top flanges of the platform-girders I. One of these bars is connected by a series of pivoted links $c$ with a longitudinal bar K, which bar K is pivotally attached to the central levers $f$, these central levers $f$ being attached at their opposite ends to links $g$, pivotally attached to the other flat bar. One of said central levers has a projecting arm to which is attached a lever pivoted to the side of the beam-box, the central levers, together with the links, forming a series of lever-and-toggle connections, so that the flat iron bars may be moved out to the edge of the platform or drawn in toward the center of the platform by manipulation of the hand-lever shown in in Fig. 5 and marked M.

In operation when the bars are drawn in toward the center of the platform the wheels of the cars will pass by the scale without coming in contact with the platform. By throwing these bars outward to their utmost limit the outer edges of the bars come underneath the flanges on the wheels of the cars, and instead of the faces of the wheels resting on the rails the car is supported by the flange of the wheels resting on these bars, thus transferring the weight of the car from the rails to the platform. The studs which retain the side bars in place are somewhat higher than the thickness of the bars, and on top of these studs is placed a covering-plate O, which covers the levers controlling the bars to prevent them getting clogged by dirt, ice, or any other foreign substance.

Various minor modifications and changes in the construction of the parts of the apparatus may be made without departing from the spirit of the invention.

Having thus described my invention, what I claim as new, and desire to secure by Letters Patent, is—

1. In an apparatus of the character described, the combination with a scale-platform and ways for supporting the vehicle to be weighed, sliding supports for the vehicle to be weighed arranged upon said platform, a longitudinal bar with pivoted links connecting said bar to one of the sliding supports, central levers pivotally connected to a stationary part of the scale-frame and having pivotal connection with said bar and links attached to the opposite ends of said central levers and pivotally secured to the other support; substantially as described.

2. In an apparatus of the character described, the combination with a central platform and ways for supporting the vehicle to be weighed, sliding supports for the vehicle to be weighed arranged upon said platform, a longitudinal bar with pivoted links connecting said bar to one of the sliding supports, central levers pivotally connected to a stationary part of the scale-frame and having pivotal connection with said bar and links attached to the opposite ends of said central levers and pivotally secured to the other support, one of said central levers having a projecting arm and a hand-lever for manipulating the same; substantially as described.

3. In an apparatus of the character described, the combination with the scale-frame, a platform and ways for supporting the vehicle to be weighed, sliding supports for the vehicle to be weighed arranged upon said platform, a longitudinal bar with pivoted links connecting said bar to one of the sliding supports, central levers pivotally connected to a stationary part of the scale-frame and having pivotal connection with said bar and links connected to the opposite ends of said central levers and pivotally secured to the other support, and a covering-plate for the levers and link connections; substantially as described.

4. In a device of the character described, a scale-platform, platform-girders, ways arranged alongside said platform, flat bars upon said platform having a stud-and-slot connection with the platform-girders, a series of toggle connections between said bars and levers, for straining and flexing said toggles; substantially as described.

In testimony whereof I affix my signature in presence of two witnesses.

ROBERT NOYES FAIRBANKS.

Witnesses:
   H. D. JAMESON,
   A. NUTTING.